United States Patent Office 3,036,047
Patented May 22, 1962

3,036,047
SYNTHETIC LINEAR THERMOPLASTIC POLY-
AMIDES FROM DIXYLYLENE TRIAMINES
Raymond J. Andres, Scottsdale, Ariz., assignor to E. I.
du Pont de Nemours and Company, Wilmington, Del.,
a corporation of Delaware
No Drawing. Filed Aug. 21, 1958, Ser. No. 756,283
13 Claims. (Cl. 260—78)

This invention relates to novel and useful organic compounds and to a process for their preparation. More specifically, it relates to novel substituted triamines and to polymeric derivatives thereof.

It is an object of this invention to provide substituted dixylylenetriamines.

Another object is to provide a process for the preparation of substituted dixylylenetriamines.

A further object is to provide linear polyamide derivatives of the substituted dixylylenetriamines.

Other objects will be apparent to one skilled in the art.

According to this invention, there is prepared an amine of the formula:

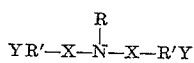

wherein R is lower alkyl or cycloaliphatic, R' is a benzene ring, X is $CH_2$ and Y is $-CH_2-NH_2$, X and Y being separated by at least three ring carbon atoms of R'; and the corresponding linear polyamide having a structural formula with the repeating unit:

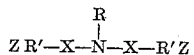

wherein R is lower alkyl or cycloaliphatic, R' is a benzene ring, X is $CH_2$, and Z is

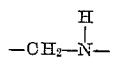

X and Z being separated by at least three ring carbon atoms of R' and Z being attached to R' through the carbon atom.

A suitable process for the preparation of the amines of this invention comprises reducing a corresponding nitrile of the formula:

$$R-N(-X-R'M)_2$$

wherein R is lower alkyl or cycloaliphatic, X is $CH_2$, R' is a benzene ring and M is $-C\equiv N$; X and M being separated by at least three ring carbon atoms of R'. These amines may be used to form the corresponding polyamides, and the polyamide will have the corresponding radical in its polymer chain. The following examples illustrate the invention.

Example I

A stream of chlorine is bubbled through 117 parts of p-tolunitrile, exposed to ultra-violet light, until 35.5 parts of chlorine have been absorbed. The mixture is then cooled and 100 parts of cold ethanol is added. Omega-chloro-para-tolunitrile crystallizes and is collected by filtration. After washing, drying and recrystallizing from 1,1,2-trichloroethylene, the product melts at 81–82° C.

The chloronitrile (113 parts), prepared as described above, is dissolved in 250 parts of methanol. A solution of 11.5 parts of methylamine in 27 parts of water is added slowly over a period of about two hours, the temperature of the reaction mass being maintained between 40–50° C. After all the methylamine is added, the methanol is distilled off and 900 parts of water containing 125 parts sodium bicarbonate are added. The organic layer is taken up in 400 parts of chloroform and separated from the aqueous layer. After drying the chloroform layer and removing the chloroform by distillation, a syrup is obtained which readily crystallizes on cooling. Colorless crystals of bis-(p-cyanobenzyl)methylamine in an amount of 82 parts, are obtained. After recrystallization from ethyl alcohol, the crystals melt at 65–66° C.

The bis-(p-cyanobenzyl)methylamine obtained as described above, in an amount of 70 parts, is placed in an autoclave which is then charged with 150 parts liquid ammonia and 10 parts of Raney nickel. Pure hydrogen is introduced until a pressure of 2,500 lbs. per square inch is reached. The apparatus is agitated and maintained at 100° C. for 45 minutes.

Bis(p-aminomethylbenzyl) methylamine, in an amount of 67.5 parts, is obtained by distillation under reduced pressure. It boils at 240° C. at a pressure equivalent to 1 millimeter mercury. After recrystallization from a mixture of 2 parts toluene and 1 part petroleum ether, it melts at 60–61° C.

The period required for hydrogenation of the nitrile to the amine will vary with such factors as the amount of catalyst, the temperature and the pressure employed. In conventional equipment, operating at from 1500–3000 lbs. pressure, a temperature of about 90 to 100° C. and with about from one part catalyst to about 7 or 10 parts nitrile, a period of from about 30 minutes to about 90 minutes is usually satisfactory.

The liquid ammonia assists in suppressing the formation of undesirable by-products. Other inert solvents such as ethyl ether, dioxane and ethanol may be used for this purpose.

While it is preferred to catalytically reduce the nitrile, other known methods such as sodium-alcohol reduction, chromous acetate suspension in alcohol, lithium aluminum hydride and the like may be used. Routes of preparation other than by reduction of the nitrile may be employed, for instance, by the reaction of N-(p-chloromethylbenzyl) phthalamide with methylamine followed by hydrolysis with alcoholic hydrazine to yield bis(p-aminomethylbenzyl)methylamine.

Example II

Following the procedures of Example I and substituting m-tolunitrile for p-tolunitrile, bis(m-aminomethylbenzyl)-methylamine, which distills at 175–178° C. as a pressure of 0.2 millimeter of mercury, is prepared. This product has an observed neutral equivalent of 91.0, as compared with a calculated 89.7.

Due to their stability toward thermal degradation the compounds of the present invention have particular utility in the preparation of high molecular weight polymers by melt polymerization techniques. The following examples are cited to illustrate such products.

Example III

The salt formed from equimolar amounts of the diamine of Example I and sebacic acid is heated in a closed vessel for one hour at 215° C. Heating is continued at atmospheric pressure for another hour at 260° C. Finally, the reaction mass is heated at 260° C. under a pressure of less than 1 mm. mercury for two hours. The colorless polyamide obtained has an inherent viscosity of 0.78 and a polymer stick temperature of 174° C. Similar procedure is followed substituting terephthalic acid, isophthalic acid and paraphenylenediacetic acid for the sebacic acid.

Fibers spun from these polymers are dyeable with acid dyes and possess excellent thermal stability.

Example IV

The salt of the diamine of Example I with adipic acid is heated in a sealed vessel for one hour to 215° C. Heating is continued under atmospheric pressure for an additional one-half hour at 260° C. The reaction mass is then heated one hour at 260° C. under a pressure of less than 1 mm. mercury. A polyamide dyeable with acid dyes with an inherent viscosity of 0.65 and a polymer stick temperature of 220° C. is formed. Yarns spun from this polymer readily crystallize on heating to 200° C.

Substitution of bis(p-aminomethylbenzyl)cyclohexylamine for the bis(p-aminomethylbenzyl)methylamine of this example produces a fiber-forming polymer, shaped articles of which are acid and direct dye sensitive.

*Example V*

Copolyamides, wherein the triamines of this invention replace a portion of the diamine in conventional polyamides, are illustrated below.

The adipic acid salt of the bis(m-aminomethylbenzyl)-methylamine prepared in Example II, is prepared by addition of an alcoholic solution of the triamine to an equivalent amount of adipic acid dissolved in alcohol. The precipitated salt is collected on a filter, washed with alcohol, and dried.

A mixture of 5250 parts of 48.9% aqueous solution of the adipic acid salt of hexamethylenediamine, 83.2 parts of the adipic acid salt of bis(m-aminomethylbenzyl)methylamine, and 11.9 parts of aqueous acetic acid (25.1%) is heated in an atmosphere of nitrogen until a total of approximately 1500 parts of water is removed. The mixture is then charged into an autoclave and is heated to 210° C. over a period of 35 minutes (autogenous pressure of 250 p.s.i.). Thirty-five parts of 20% titanium dioxide slurry is pumped in, and during the next hour the temperature is raised to 245° C. (250 p.s.i. pressure). Pressure is slowly (90 minutes) reduced to atmospheric, during which time the temperature rises to about 275° C. After an additional 30 minutes at this temperature, the polyamide is converted to flake form as described by Graves in U.S. Patent 2,289,774. The flake is spun to yarn following the teachings of Waltz in U.S. Patent 2,571,975. A 13-filament yarn is formed which is cold drawn (draw ratio 3.41) to a final denier of 40. The yarn has a tenacity of 5.4 grams per denier, an elongation of 29%, and a relative viscosity of 37.5. When dyed with an excess of Anthraquinone Blue SWF (Prototype of CI 12), Milling Red SWB (CI 430), or Pontamine Fast Red 8 BLX (CI 278), this yarn picks up approximately twice as much of the dyestuff as does a control containing no bis(m-aminomethylbenzyl) methylamine.

Fibers spun from the polymers of the present invention possess excellent sensitivity toward acid and direct dyes. While the preferred proportion of tertiary dixylylene nitrogen for this purpose in any particular polymer will vary, it has been found that the presence of from about 0.1% to 6% and preferably 0.1% to 0.5% by weight of such nitrogen within the polymer is highly advantageous.

Generically, the polymer may be conveniently expressed as a polyamide containing regularly or randomly disposed recurring structural units of the type:

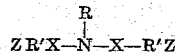

wherein R is lower alkyl or cycloaliphatic, R' is a benzene ring, X is $CH_2$ and Z is

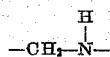

X and Z being separated by at least three ring carbon atoms of R' and Z being attached to R' through the carbon atom. A valuable embodiment is a polyamide having recurring structural units of the formula:

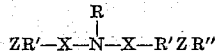

wherein R is lower alkyl or cycloaliphatic, R' is a benzene ring, X is $CH_2$, Z is

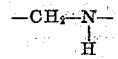

X and Z being separated by at least three ring carbon atoms of R', and R" is a radical selected from the group consisting of (A)
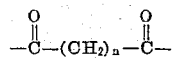

wherein n is a number from 0 to 12 inclusive, preferably 4–8 inclusive, (B)
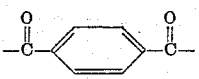

(C)
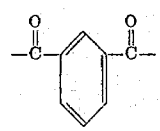

(D)

wherein x is an integer from 1 to 4, inclusive; Z being attached to R' through the carbon atom and to R" through the nitrogen atom.

Other suitable lower alkyl radicals include ethyl, propyl, isopropyl, butyl, amyl, hexyl, and decyl. Suitable cycloaliphatic radicals include cyclohexyl, substituted cyclohexyl, cyclohexenyl, and other carbocyclic radicals. Additional suitable triamines include bis(m-aminomethylbenzyl) - methylamine, bis(m-aminomethylbenzyl)isopropylamine, bis(m-aminomethylbenzyl) cyclohexylamine, bis(m-aminomethylbenzyl) octylamine, the corresponding para-compounds, and compounds of mixed orientation, such as m-aminomethylbenzyl-p-aminomethylbenzylethylamine.

The triamines of the present invention may be introduced as part of the polymer chain of conventional polyamides, polyesters, polyurethanes and the like, by conventional copolymerization techniques to enhance dyeability of fibers made from them. Alternatively, a polymer containing the triamines of this invention may be blended with a fiber-forming polymer. For example, the tertiary amine modified polymer is broken up to small particle size in an Abbe cutter and thoroughly mixed with the other polymer, e.g., polyethylene terephthalate flake.

The mixture of polymers is heated until melted in a high vacuum under a nitrogen atmosphere, after which the melt is stirred for 10 to 20 minutes until complete mixture of the polymer is attained. The blending of the polymers may also be achieved through mixing together of the molten polymers at elevated temperatures under a nitrogen atmosphere with thorough stirring.

Polymers containing the compositions of this invention, whether introduced through melt blending or copolymerization techniques are receptive to acid and direct dyes. Among the dye-stuffs which are useful are included Anthraquinone Blue SWF (Prototype of C.I. 12), Pontacyl Rubine R (C.I. 179), Du Pont Milling Red SWB (C.I. 430), Anthraquinone Green GN (C.I. 1078), Pontacyl Light yellow G.G. (C.I. 636), Pontamine Yellow CH (C.I. 365), Pontamine Fast Red 8BLX (C.I. 278), and Pontamine Fast Orange EGL (Prototype of C.I. 72).

Polymers containing the meta-oriented compositions are particularly preferred in that fibers formed from these polymers after bleaching show a better resistance to yellowing caused by excessive heat.

As is known in the art, polyamides normally prepared from adipic acid and hexamethylenediamine contain about 40–45 equivalents of primary amine groups per million grams of polymer. This level of basicity provides some dyeability with acid dyes. As is also known in the art, this dyeability can be increased somewhat by employing a slight excess of hexamethylenediamine so that an amine end level up to about 60–80 equivalents per million grams is obtained, but significantly higher levels are not desirable as they are accompanied by excessive reduction in molecular weight and generally poor yarn processability. The use of the high levels of amine ends of the prior art, however, can be combined with the use of the substituted dixylylenetriamines of the present invention to achieve enhanced dyeability without the undesirable loss in molecular weight and processability.

This application is a continuation-in-part of U.S. application Serial Number 472,220, filed November 30, 1954.

I claim:

1. A substituted dixylylenetriamine of the formula:

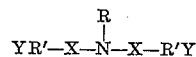

wherein R is a member of the class consisting of lower alkyl and cycloaliphatic groups, R' is a benzene ring, X is $CH_2$, and Y is $-CH_2-NH_2$; X and Y being separated by at least three ring carbon atoms of R'.

2. The composition of matter of the formula:

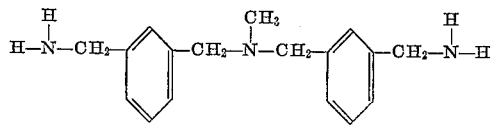

3. The composition of matter of the formula:

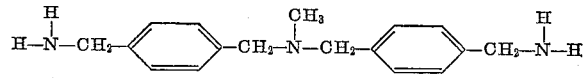

4. A process for preparing a compound of the formula:

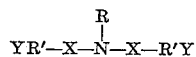

wherein R is a member of the class consisting of lower alkyl and cycloaliphatic groups, R' is a benzene ring, X is $CH_2$, and Y is $-CH_2-NH_2$, X and Y being separated by at least three ring carbon atoms of R', which comprises reacting a nitrile of the formula $$R-N(-X-R'M)_2$$

wherein R is a member of the class consisting of lower alkyl and cycloaliphatic groups, X is $CH_2$, R' is a benzene ring and M is $-C\equiv N$, X and M being separated by at least three ring carbon atoms of R', with hydrogen, in the presence of a catalyst.

5. A process for preparing the compound of the formula:

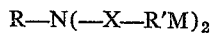

which comprises reacting a nitrile of the formula

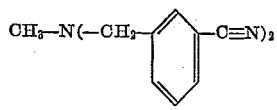

with hydrogen, in the presence of a catalyst.

6. A process for preparing the compound of the formula:

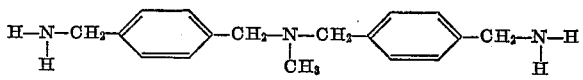

which comprises reacting a nitrile of the formula

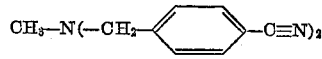

with hydrogen, in the presence of a catalyst.

7. A synthetic, linear, thermoplastic polyamide, containing the recurring structural unit:

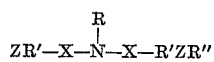

wherein R is a member of the class consisting of lower alkyl and cycloaliphatic groups, R' is a benzene ring, X is $CH_2$, Z is

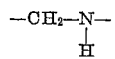

X and Z being separated by at least three ring carbon atoms of R', and R'' is a radical selected from the group consisting of (A) 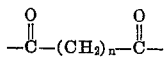

wherein $n$ is a number from 0 to 12, (B) 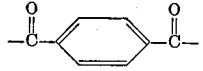

(C) 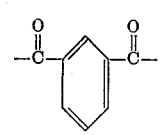

(D) 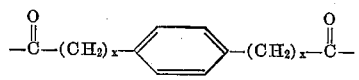

wherein $x$ is an integer from 1 to 4, Z being attached to R' through the Z carbon atom and to R'' through the Z nitrogen atom, there being at least 0.1% by weight of tertiary nitrogen in the polyamide.

8. A synthetic, linear, thermoplastic polyamide containing the recurring structural unit:

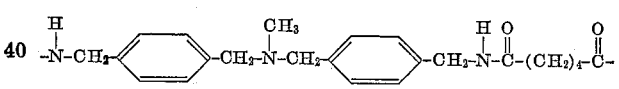

9. A synthetic, linear, thermoplastic polyamide containing the recurring structural unit:

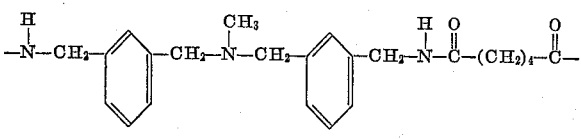

10. A fiber of the polyamide of claim 9.

11. A synthetic, linear, thermoplastic polyamide containing the recurring structural unit:

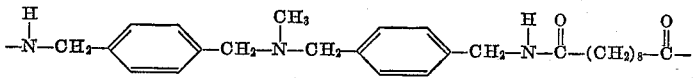

12. A synthetic, linear, thermoplastic polyamide containing the recurring structural unit:

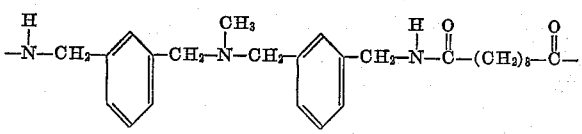

13. A fiber of the polyamide of claim 8.

References Cited in the file of this patent

UNITED STATES PATENTS

| | | |
|---|---|---|
| 2,274,831 | Hill | Mar. 3, 1942 |
| 2,844,631 | Wilkes | July 22, 1958 |